(12) United States Patent
Yuan et al.

(10) Patent No.: US 10,149,459 B1
(45) Date of Patent: Dec. 11, 2018

(54) TREAT-DISPENSING PET TOY

(71) Applicant: TONGFU MANUFACTURING CO., LTD., Nanjing, Jiangsu Province (CN)

(72) Inventors: Huixin Yuan, Nanjing (CN); Wen Zhang, Nanjing (CN)

(73) Assignee: TONGFU MANUFACTURING CO., LTD., Nanjing (CN)

( * ) Notice: Subject to any disclaimer, the term of this patent is extended or adjusted under 35 U.S.C. 154(b) by 0 days.

(21) Appl. No.: 16/117,057

(22) Filed: Aug. 30, 2018

(30) Foreign Application Priority Data

Sep. 18, 2017 (CN) .................... 2017 2 1190952 U

(51) Int. Cl.
*A01K 15/02* (2006.01)
*A01K 5/01* (2006.01)

(52) U.S. Cl.
CPC .......... *A01K 15/026* (2013.01); *A01K 5/0114* (2013.01)

(58) Field of Classification Search
CPC ... A01K 15/026; A01K 15/025; A01K 5/0114
USPC .............. 119/709, 711, 707, 710, 702, 51.01
See application file for complete search history.

(56) References Cited

U.S. PATENT DOCUMENTS

| | | | | | |
|---|---|---|---|---|---|
| 5,191,856 A | * | 3/1993 | Gordon | ................ | A01K 15/025 119/711 |
| 5,857,431 A | * | 1/1999 | Peterson | .............. | A01K 15/026 119/710 |
| 6,112,703 A | * | 9/2000 | Handelsman | ........ | A01K 15/026 119/707 |
| 6,158,391 A | * | 12/2000 | Simonetti | ............ | A01K 5/0114 119/702 |
| 7,263,952 B1 | * | 9/2007 | Tsengas | ............... | A01K 15/026 119/709 |
| 7,270,085 B2 | * | 9/2007 | Wolfe, Jr. | ............ | A01K 5/0114 119/709 |
| 7,647,894 B2 | * | 1/2010 | Axelrod | ............... | A01K 15/026 119/51.01 |
| 8,342,132 B2 | * | 1/2013 | Markham | ............ | A01K 15/026 119/709 |
| D685,146 S | * | 6/2013 | Stiles | ........................ | D30/160 |
| 8,875,663 B2 | * | 11/2014 | Axelrod | ............... | A01K 15/026 119/710 |
| 2003/0079693 A1 | * | 5/2003 | Jager | .................... | A01K 15/026 119/707 |
| 2005/0045115 A1 | * | 3/2005 | Mann | ................... | A01K 15/026 119/711 |

* cited by examiner

*Primary Examiner* — Yvonne R Abbott-Lewis
(74) *Attorney, Agent, or Firm* — Oliff PLC

(57) ABSTRACT

An improved treat-dispensing pet toy includes a hollow chamber, which is made of flexible elastic material and has a plurality of slots in the inside of the chamber; the slot has a plug removably clamped to the slot, which is made of pet food and includes a protruding cap and a protruding button connected to each other to form a dumbbell shape, and a middle connection position of the plug can break when being chewed by a pet; the protruding cap is exposed out of the chamber and the protruding button is inserted into the slot; and the chamber has a food leakage opening in communication with the inside of the chamber, which has a block structure that can prevent food in the chamber from easily falling off, and when the chamber is pressed, the block structure deforms to enable the food in the chamber to leak from the opening.

4 Claims, 1 Drawing Sheet

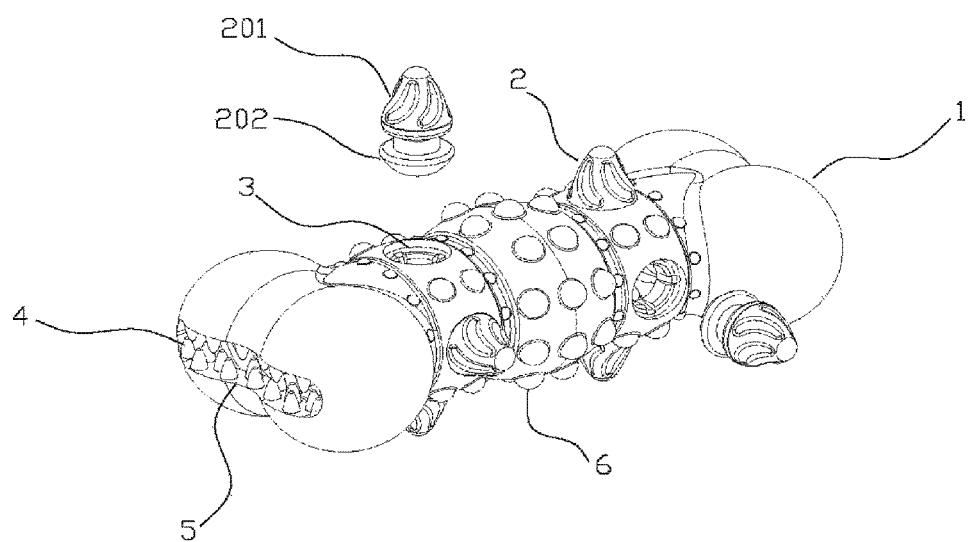

TREAT-DISPENSING PET TOY

BACKGROUND

Technical Field

The utility model relates to a pet toy, in particular, to a pet toy that can prolong the pet's attraction, and specifically, to an improved treat-dispensing pet toy.

Related Art

Rapid economic development brings about a rise in living standards. Many pet parents are no longer content with the simple feeding way. Physical and mental health of pets earn increasing concerns. Currently, a toy is mainly provided to relieve emotions such as boredom and discontent of a pet caused by being at home alone, or to achieve functions of massaging gums and cleaning teeth, and food is added to the toy to maintain interest of the pet in the toy. However, the food attached to such an existing toy is consumed too rapidly, and the pet will lose interest in the toy after eating up the food. Consequently, the functions of accompanying the pet and of massaging gums and cleaning teeth cannot be performed. Therefore, a treat-dispensing pet toy that can prolong the pet's attraction needs to be designed.

SUMMARY

The objective of the utility model is to provide an improved treat-dispensing pet toy to make up for drawbacks in the prior art. The improved treat-dispensing pet toy can effectively extend chewing time, increase attraction of the toy to the pet, improve the satisfaction of the pet, and meet requirements on pet raising.

Technical solutions of the utility model are:

An improved treat-dispensing pet toy includes a hollow chamber which is made of flexible elastic material and is provided with a plurality of slots in communication with the inside of the chamber; the slot is provided with a plug removably clamped to the slot; the plug is made of pet food and includes a protruding cap and a protruding button connected to each other to form a dumbbell shape, and the middle connection position of the plug can break when being chewed by a pet; the protruding cap is exposed out of the chamber and the protruding button is inserted into the slot; and the chamber is provided with a food leakage opening in communication with the inside of the chamber. The food leakage opening is provided with a block structure that can prevent food in the chamber from easily falling off, and when the chamber is pressed, the block structure deforms to enable the food in the chamber to leak from the food leakage opening.

Further, the block structure is a plurality of toothed spiky points made of flexible elastic materials and arranged along an upper edge and a lower edge of the food leakage opening, and the spiky points on the upper edge are interlaced with the spiky points on the lower edge, to prevent the food from falling off the chamber.

Further, the textured outer surface of the chamber helps a pet to chew and massage gums.

Further, an appearance of the chamber is of a style that can attract a pet.

Beneficial effects of the utility model are:

The utility model is reasonable in design, simple in structure, and convenient to use, and can effectively extend chewing time of a pet, increase attraction of the toy to the pet, and improve the satisfaction of the pet. In addition, it can also keep the pet occupied and help massage gums and clean the pet's teeth, to fully_meet requirements on pet raising.

BRIEF DESCRIPTION OF THE DRAWINGS

FIG. 1 is an exploded structural view of a pet toy according to an embodiment.

1: Chamber; 2: Plug; 201: Protruding cap; 202: Protruding button; 3: Slot; 4: Spiky points; 5: Food leakage opening; 6: Nub

DETAILED DESCRIPTION

The following further describes the utility model with reference to the accompanying drawings and embodiments.

As shown in FIG. 1:

An improved treat-dispensing pet toy includes a hollow chamber 1, and the hollow chamber 1 is made of flexible elastic material, for example, the rubber, so that the chamber 1 can deform when being pressed and restore to an original shape after external force is removed. The chamber 1 is provided with a plurality of slots 3 in communication with the inside of the chamber 1. The slot 3 is provided with a plug 2 removably clamped to the slot 3. The plug 2 is made of pet food and includes a protruding cap 201 and a protruding button 202 connected to each other to form a dumbbell shape, and a middle connection position of the plug 2 can break when being chewed by a pet. The slot 3 is in a shape of a circle, and a diameter of the slot 3 is slightly smaller than diameters of the protruding cap 201 and the protruding button 202, therefore, the slot 3 slightly deforms when being pressed by the protruding button 202, so as to clamp the protruding button 202 into the slot 3 and to fixedly dispose the protruding cap 201 outside the chamber and the protruding button 202 inside the chamber 1. The protruding cap 201 may be manufactured into a shape of a cone or the like that may not only attract a pet to chew the protruding cap 201 but also have functions of massaging gums and cleaning teeth. The chamber is provided with a food leakage opening in communication with the inside of the chamber. There are two food leakage openings 5 respectively disposed at two ends of the chamber 1, and each food leakage opening 5 is provided with a block structure that can prevent food in the chamber 1 from easily falling off.

The block structure is a plurality of toothed spiky points 4 made of flexible elastic materials and arranged along an upper edge and a lower edge of the food leakage opening 5, and the spiky points on the upper edge are interlaced with the spiky points on the lower edge, to prevent the food from falling off the chamber 1. When the food leakage opening 5 is pressed, the food leakage opening 5 with toothed spiky points 4 deforms and opens, to enable the food in the chamber 1 to leak out.

The textured outer surface of the chamber 1 helps a pet to chew and massage gums. Preferably, hemispherical nubs 6 are on the outer surface of the chamber, to better massage gums and clean teeth for the pet.

An appearance of the chamber 1 is of a style that can attract a pet, for example, an animal shape, a food shape, a ball shape, or other geometric shapes. In this embodiment, the chamber 1 is in a shape of a bone that can attract the pet.

A use method of the utility model is: The plugs are respectively clamped into the slots on the chamber to make the protruding caps located outside and the protruding buttons located inside. After a pet chews the chamber and bites off the protruding cap, the corresponding protruding button falls off, or the protruding button falls off because the slot portion slightly deforms in a chewing process, and the protruding buttons fall off into a cavity inside of the chamber. After eating up all the protruding caps on the slots, the pet is still attracted by the protruding buttons in the chamber and continues to chew the chamber. In the chewing process of the pet, the nubs on the surface of the toy may achieve the functions of massaging gums and cleaning teeth. Eventually, when the pet chews the food leakage opening and the food leakage opening with the toothed spiky points deforms and opens, the protruding buttons in the chamber may leak out, so that the pet will get unexpected pleasure. In addition, the toothed spiky points may also perform a function of cleaning teeth. After all the plugs are consumed, new plugs may be mounted again to continue to be used, thereby extending the life span of the toy.

Parts not included in the utility model are similar to the prior art or may be achieved by using the prior art.

What is claimed is:

1. An improved treat-dispensing pet toy, comprising a hollow chamber, wherein the chamber is made of flexible elastic material and is provided with a plurality of slots in communication with the inside of the chamber; the slot is provided with a plug removably clamped to the slot; the plug is made of pet food and comprises a protruding cap and a protruding button connected to each other to form a dumbbell shape, and a middle connection position of the plug can break when being chewed by a pet; the protruding cap is exposed out of the chamber and the protruding button is inserted into the slot; and the chamber is provided with a food leakage opening in communication with the inside of the chamber, the food leakage opening is provided with a block structure that can prevent food in the chamber from easily falling off, and when the chamber is pressed, the block structure deforms to enable the food in the chamber to leak from the food leakage opening.

2. The improved treat-dispensing pet toy according to claim 1, wherein the block structure is a plurality of toothed spiky points made of flexible elastic materials and arranged along an upper edge and a lower edge of the food leakage opening, and the spiky points on the upper edge are interlaced with the spiky points on the lower edge, to prevent the food from falling off the chamber.

3. The improved treat-dispensing pet toy according to claim 1, wherein the textured outer surface of the chamber helps a pet to chew and massage gums.

4. The improved treat-dispensing pet toy according to claim 1, wherein an appearance of the chamber is of a style that can attract a pet.

* * * * *